(12) United States Patent
Tofano

(10) Patent No.: US 8,886,716 B2
(45) Date of Patent: Nov. 11, 2014

(54) CLOUD-BASED DE-DUPLICATION

(76) Inventor: Jeffrey Vincent Tofano, San Jose, CA (US)

(*) Notice: Subject to any disclaimer, the term of this patent is extended or adjusted under 35 U.S.C. 154(b) by 322 days.

(21) Appl. No.: 13/351,183

(22) Filed: Jan. 16, 2012

(65) Prior Publication Data

US 2012/0226741 A1 Sep. 6, 2012

(51) Int. Cl.
- *G06F 1/32* (2006.01)
- *H04L 29/06* (2006.01)
- *H04L 29/08* (2006.01)

(52) U.S. Cl.
CPC ............ *H04L 67/2804* (2013.01); *H04L 69/03* (2013.01); *H04L 67/2819* (2013.01)
USPC ........... 709/203; 711/114; 711/135; 711/162; 711/163; 710/74

(58) Field of Classification Search
USPC ........ 711/135–163; 709/203–227; 710/72–74
See application file for complete search history.

(56) References Cited

U.S. PATENT DOCUMENTS

| | | | |
|---|---|---|---|
| 7,873,809 B2* | 1/2011 | Kano | 711/216 |
| 8,082,228 B2* | 12/2011 | Mu | 707/650 |
| 2007/0255758 A1 | 11/2007 | Zheng et al. | |
| 2008/0082480 A1* | 4/2008 | Gounares et al. | 707/2 |
| 2008/0301134 A1 | 12/2008 | Miller et al. | |
| 2009/0235022 A1 | 9/2009 | Bates et al. | |
| 2011/0022812 A1* | 1/2011 | van der Linden et al. | 711/163 |
| 2012/0159175 A1* | 6/2012 | Yocom-Piatt et al. | 713/176 |
| 2012/0233135 A1 | 9/2012 | Tofano | |

FOREIGN PATENT DOCUMENTS

| | | |
|---|---|---|
| EP | 2256934 A1 | 12/2010 |
| GB | 2473409 A | 3/2011 |
| GB | 2482128 A | 1/2012 |

OTHER PUBLICATIONS

"PeerDedupe: Insights into the Peer-assisted Sampling Deduplication"—Xing et al, Aug. 2010 http://net.pku.edu.cn/~lzh/papers/[P2P'10]%20PeerDedupe.pdf.*
Combined Search and Examination Report dated Feb. 11, 2011 issued in connection with corresponding UK patent application No. 1100754.9.
"Sparse Indexing: Large scale, incline deduplication using sampling and locality," Lillibridge et al., 2009, Proceedings of $7^{th}$ USENIX Conference on File and Storage Technologies, pp. 111-123.
"PeerDedupe: Insights into the Peer-assisted Sampling Deduplication," Xing et al., Aug. 2010, Department of Computer science and Technology, Peking University, China; 2010 IEEE P2P Proceedings; pp. 1-10.

* cited by examiner

Primary Examiner — Randy Scott

(57) ABSTRACT

Example apparatus, methods, and computers support cloud-based de-duplication with transport layer transparency. One example apparatus includes a processor, a memory, and an interface to connect the processor, memory, and a set of logics. The set of logics includes a hardware identification logic for identifying networking hardware used by or available to the apparatus to interact with a cloud-based computing environment and a protocol identification logic for identifying a protocol used by or available to the apparatus to communicate messages for the cloud-based computing environment through the networking hardware. The set of logics also includes a de-duplication preparation logic for preparing a message to carry data to be de-duplicated and metadata concerning the data to be de-duplicated. The message is to be provided to the cloud-based computing environment through the networking hardware according to the protocol.

20 Claims, 5 Drawing Sheets

CLOUD-BASED DE-DUPLICATION

CROSS-REFERENCE TO RELATED APPLICATIONS

This application claims priority to British Patent Application No. 1100756.4 filed on Jan. 17, 2011 the disclosure of which is hereby incorporated by reference in its entirety.

BACKGROUND

Broadly, this writing discloses a cloud-based de-duplication with transport layer transparency.

The term "cloud" is often used as a metaphor for the Internet. Cloud computing may involve many computers. In cloud computing, software, data, services, devices, and other entities reside at servers. In cloud computing, some of the computers may be data de-duplication clients and some of the computers may be de-duplication servers. Many, or even most of the computers associated with a cloud will be neither de-duplication clients nor de-duplication servers. Data de-duplication may be referred to as "dedupe".

When a dedupe client sends packets out onto the cloud for dedupe processing, the dedupe client wants a dedupe server(s) to be able to recognize that packet and process it appropriately. Collaborating dedupe clients and servers want to be able to send packets onto the cloud and have the packets accepted by dedupe enabled collaborators. Collaborating dedupe clients and servers also want those packets to be ignored by non-dedupe enabled computers with proper results. Collaborating dedupe clients and servers want to cause the selective accepting and ignoring of packets without breaking any existing functionality and without requiring customized, proprietary interfaces or protocols with the cloud.

Universal and/or standard interfaces and protocols already exist for cloud computing. For example 802.11 defines networking hardware and rules for communicating with a network. Similarly, simple object access protocol (SOAP) defines envelopes, encoding rules, and other standard ways to communicate certain types of packets. A computer may be interacting with many servers in the cloud through these universal and/or standard interfaces and protocols. Dedupe functionality is often added into a client that is already interacting with other services and other servers. Conventionally, adding dedupe functionality may have involved forcing the client to which the dedupe functionality was added to use an interface or protocol other than the universal and/or standard interfaces or protocols. This may be unacceptable in many applications.

One type of conventional dedupe includes chunking a larger data item (e.g., object, file) into sub-blocks, computing hashes or other identifiers for the sub-blocks, and processing the hashes or other identifiers instead of the sub-blocks. Chunking includes selecting boundary locations for fixed and/or variable length sub-blocks while hashing includes computing a hash of the resulting chunk. A chunk may also be referred to as a sub-block. Comparing relatively smaller hashes (e.g., 128 bit cryptographic hash) to make a unique/duplicate decision can be more efficient than comparing relatively larger chunks (e.g., 1 kB, 128 kB, 1 MB) of data using a byte-by-byte approach. Regardless of the dedupe particulars (e.g., chunking approach, hashing approach), it may be desirable to engage in collaborative cloud-based dedupe. Collaborative cloud-based dedupe may involve communicating data to be deduped, information about data to be deduped, information about dedupe processing, and so on, between clients and servers using the cloud.

"Cloud computing" refers to network (e.g., internet) based computing where shared resources, software, interfaces, and information are provided to computers and other devices on demand. On-demand provision of resources in cloud computing is often compared to providing electricity on-demand because like the electricity grid, a cloud can provide dynamically scalable resources. One model for cloud computing is to have multiple components, each of which do something really well, and all of which work well together. Therefore, adding a dedupe functionality on top of pre-existing functionality should not disturb the other functionality.

In cloud-based computing, interactions between entities may be defined by a quality of service (QoS) that is related to a service level agreement. Cloud-based computing customers likely do not own the physical infrastructure they are using to engage in cloud-based computing. Instead, the customers rent, lease, or subscribe for usage from a third-party provider. The customers consume resources (e.g., bandwidth, packets delivered, data stored, processor cycles used) as a service and pay for the resources consumed. The customers may be billed using a utilities model (e.g., electricity), on a subscription basis, or otherwise. Cloud-based computing customers may become interested in data de-duplication to reduce the amount of data stored and transmitted using the cloud. Therefore, cloud-based computing customers may add dedupe functionality to an already functioning configuration. When they add the dedupe functionality, the cloud-based computing customers do not want their existing functionality to break or even to slow down. Conventional proprietary systems have typically required non-transparent interfaces or protocols that have had negative effects on pre-existing configurations.

BRIEF DESCRIPTION OF THE DRAWINGS

The accompanying drawings, which are incorporated in and constitute a part of the specification, illustrate various example methods, apparatuses, and other example embodiments of various aspects of the invention described herein. It will be appreciated that the illustrated element boundaries (e.g., boxes, groups of boxes, other shapes) in the figures represent one example of the boundaries of the elements. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
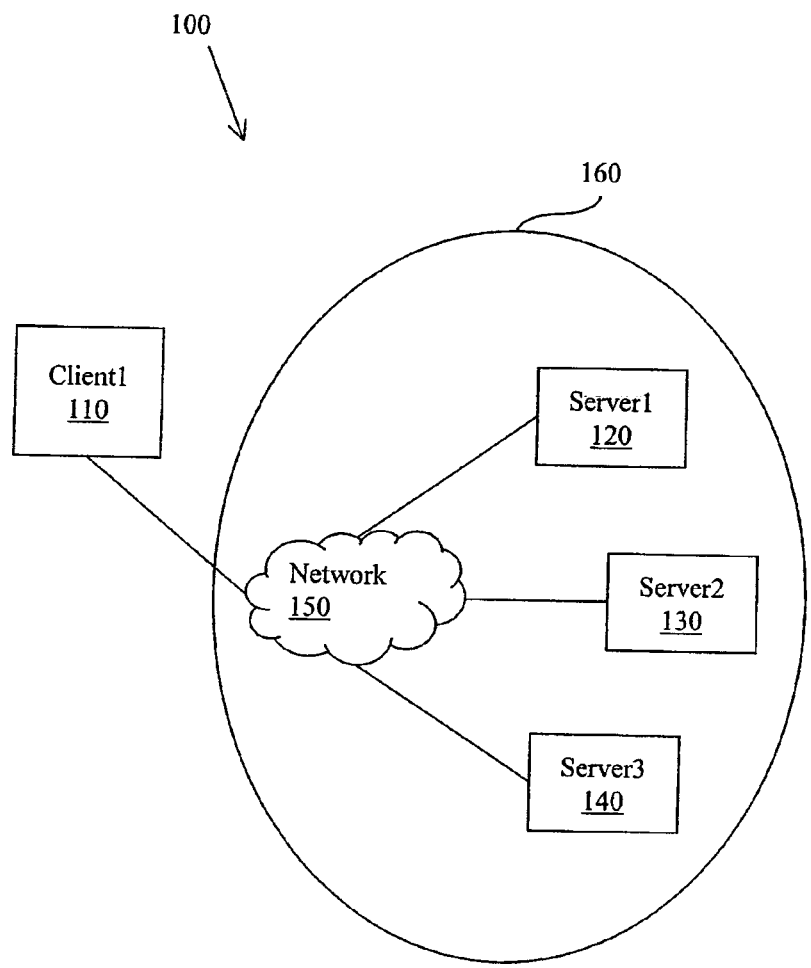
FIG. 1 illustrates a cloud-based collaborative de-duplication environment.

Example systems and methods support collaborative cloud-based de-duplication while maintaining transport layer transparency. Example systems and methods facilitate engaging in cloud-based collaborative dedupe using pre-existing universal or standard cloud interfaces. The universal or standard cloud interfaces may operate at different levels including the transport layer.

The core of collaborative dedupe is to push some processing and some data out to clients without pushing too much processing and data out to the clients. Appropriate actions to be pushed to clients include identifying boundaries and forming chunks. Therefore, packets that dedupe clients send into the cloud may include data that is already chunked and hashed. Example systems place information about how the data was chunked and hashed in the packet in a transport layer transparent manner that does not disrupt pre-existing functionality. Being transport layer transparent means that an apparatus that was previously not dedupe enabled may participate in cloud-based data de-duplication without raising exceptions in either the interfaces or protocols already being used by or already known to the apparatus to interact with the cloud-based computing environment. Thus, packets prepared using example systems and methods may pass through the interfaces and protocols without the apparatus having to take any additional interfacing or protocol actions. Understanding source dedupe and target dedupe facilitates understanding collaborative dedupe. Source dedupe is a scheme where dedupe processing is always distributed between two or more nodes. Target dedupe is a scheme where dedupe processing is always performed at one node. Collaborative dedupe involves being able to mix both source and target dedupe. Selectively pushing appropriate processing and/or data to clients facilitates balancing wire cost against processing cost.

One example standard interface relies on XML (extensible markup language) attributes to describe and characterize data in packets that are transmitted through the interface. XML attributes provide information about data that is not considered to be part of the data itself. For example, an XML attribute may identify a language (e.g., English) for a record that is transferred in an XML-based communication. Example systems and methods may attach "genetic material" to outgoing packets using XML attributes known to and accepted by cloud interfaces. The genetic material may identify packets as being provided by and intended for collaborating dedupe clients and servers. The genetic material may also provide information for how to process the actual data in a packet. For collaborative dedupe, the genetic material may include, for example, hashes computed using a particular algorithm, a hash algorithm identifier, a boundary placing algorithm identifier, boundary locations, a dialect identifier, and so on.

Example systems and methods seek to perform cloud-based de-duplication while maintaining transport layer transparency. Therefore, in different embodiments, example systems and methods interact seamlessly with cloud-based application programming interfaces (APIs) including, for example, SOAP-based (simple object access protocol) interfaces and REST-based (representational state transfer) interfaces.

SOAP is a basic messaging framework upon which web services can be built. SOAP is an XML based protocol for exchanging structured information in the implementation of web services in computer networks. SOAP uses standards based RPC (remote procedure call) and HTTP (hypertext transfer protocol) to support message negotiation and transmission. Understanding the XML-based SOAP protocol involves understanding at least three concepts. First is the SOAP envelope. The envelope defines what is in a message and how to process it. Second is SOAP encoding. The encoding proceeds according to a set of encoding rules for expressing instances of application-defined data types. Third are conventions for representing procedure calls and responses. In one embodiment, example systems and methods prepare collaborative dedupe packets to comply with the SOAP protocol. This may include populating envelope information to comply with SOAP and encoding application-defined data types (e.g., hash, dialect identifier, boundary identifier) according to encoding rules. Since collaborative dedupe may involve procedure calls and responses, in this embodiment, example systems and methods may also adhere to a SOAP-compliant convention for representing those procedure calls and responses.

REST is a style of software architecture for distributed systems including, for example, hypermedia systems (e.g., world wide web). REST is a client/server model that uses requests and responses that are built around representations of resources. In one embodiment, example systems and methods represent dedupe resources according to the REST style. The dedupe resources may include, for example, chunking resources, hashing resources, indexing resources, storage resources, and so on. In this embodiment, dedupe clients and servers may employ requests and responses that are built around the representations of the dedupe resources.

FIG. 1 illustrates a cloud-based collaborative dedupe environment 100. In environment 100, client1 110 interacts with server1 120, server2 130, and server3 140 through a network 150. The network 150 may be, for example, the internet. Server1 120, server2 130, server3 140, and network 150 may be part of a cloud 160 with which client1 110 can interact.

Initially, client1 110 may not have been dedupe enabled but then may have become dedupe enabled by adding software, hardware, firmware, or a combination thereof. Server1 120 may not be dedupe enabled, server2 130 may be dedupe enabled using a first (e.g., older) dialect and approach, and server3 140 may be dedupe enabled using a second (e.g., newer) dialect and approach. Client1 110 may have had pre-existing functionality before it was dedupe enabled. After becoming dedupe enabled, client1 110 may want to perform collaborative dedupe using a cloud-based approach.

In one example, client1 110 may have some data that it wants to have stored in an efficient de-duplicated manner. Client1 110 may chunk and hash that data. Client1 110 may then send a packet(s) out into the cloud 160 hoping that a dedupe enabled server will recognize the packet, will recognize the dedupe approach (e.g., chunking, hashing, sampling) and be able to efficiently dedupe the data (e.g., selectively store unique chunks, selectively not store duplicate chunks). Recall that client1 110 was already interacting with servers through the cloud 160 before it became dedupe enabled. Therefore, to maintain transport layer transparency, client1 110 may create a packet of a type (e.g., SOAP, REST) that is already known to the cloud. Client1 110 may place dedupe data (e.g., data, hash) into the body of the packet and may also place dedupe metadata into other portions of the packet. For example, client1 110 may place information about how it chunked the data and about how it hashed the data in XML attributes associated with the known packet type. In one embodiment, client1 110 may simply place hashes in the XML attributes.

The three different servers may all see the packet and may all process it differently. Server1 120 may see the packet and ignore it because server1 120 is not a dedupe server. Server2 130 may see the packet and try to parse it but may not produce the right or best result because server2 130 only partially understands the dedupe information. Server2 130 may only partially understand the information because it has a less up-to-date version of the collaborative dedupe software or dialect. Server2 130 may provide a first response to client1

110. This first response may include a request to negotiate with client1 110 concerning whether client1 110 is willing or able to use the older dialect available at server2 130. Additionally, server2 130 may take steps to upgrade itself based on its realization that it received from the cloud 160 a dedupe packet that it could not fully process. Clearly the packets sent by server2 130 are of no interest to non-dedupe enabled clients and servers. Example systems and methods add the functionality to send/receive these types of packets without interrupting or disrupting pre-existing functionality and without requiring special (e.g., proprietary) interfaces.

Server3 140 may see the packet and may be able to fully parse and understand the packet. Therefore, server3 140 may send client1 110 messages that indicate that server3 140 got the packet, understood the packet, and deduped the data associated with the packet. Server3 140 may also tell client1 110 to go ahead and send over any more packets it might have. Server3 140 and client1 110 may therefore begin a negotiation concerning immediate and more distant dedupe. Recall that client1 110 may have to pay for cloud services on a consumption basis. Therefore client1 110 may be interested in minimizing the amount of cloud resources that it consumes. Recall also that it may be desirable to minimize the amount of resources consumed at client1 110 to support dedupe. Therefore client1 110 may be configured with one or more small permuted data structures and software for chunking, hashing, and preparing packets for the cloud 160. Using the pre-existing packet types that work with the pre-existing interfaces between client1 110 and the cloud 160 facilitates minimizing the amount of software that needs to be added to client1 110 to support dedupe. Using the pre-existing packet types and the pre-existing interfaces also supports establishing cloud-based de-duplication transport layer transparency.

"Transport layer" as used herein refers to a processing level in a networking protocol. Transport layer is commonly used to refer to a layer in the Open Systems Interconnect theoretical networking stack that includes the application, presentation, session, transport, network, data link, and physical layers. Different networking protocols and stacks implement functionality at different layers in different ways. Therefore, "transport layer" as used herein, refers to processing associated with providing end-to-end communication services for applications in a layered architecture of network components and protocols.

Figure 2:
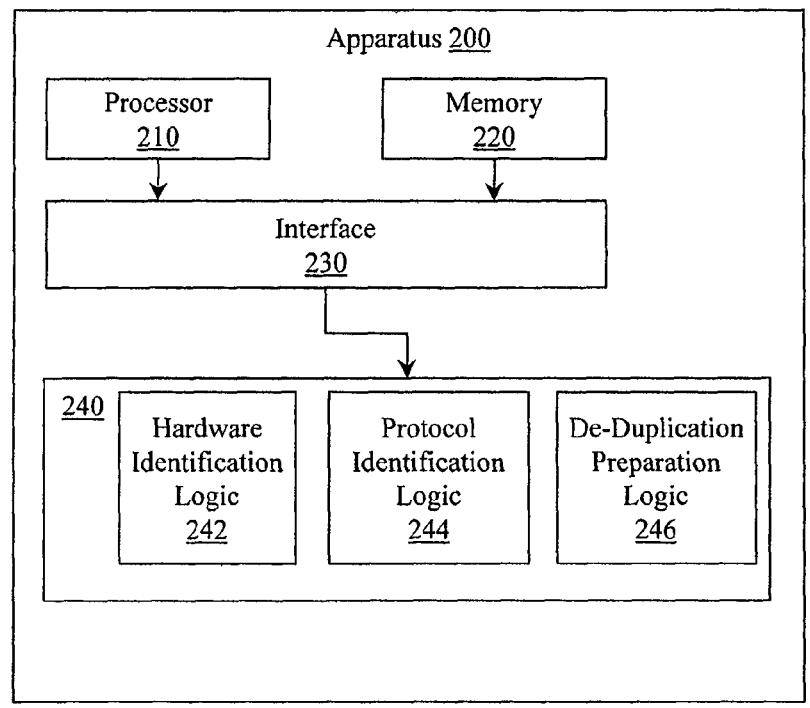
FIG. 2 illustrates an apparatus that supports cloud-based de-duplication with transport layer transparency.

FIG. 2 illustrates an apparatus 200 that supports cloud-based de-duplication with transport layer transparency. Apparatus 200 includes a processor 210, a memory 220, and an interface 230. Interface 230 connects the processor 210, the memory 220, and a set 240 of logics. The set 240 of logics includes a hardware identification logic 242, a protocol identification logic 244, and a de-duplication preparation logic 246. Apparatus 200 may include other logics that support other interactions with a cloud-based computing environment. Apparatus 200 may have been interacting with a cloud-based computing environment before becoming dedupe enabled. Using the set 240 of logics, apparatus 200 may participate in collaborative cloud-based data de-duplication without raising exceptions in either the interfaces or protocols being already being used by the apparatus 200 to interact with the cloud-based computing environment. Thus, packets prepared using the set 240 of logics may pass through the interfaces and protocols without the apparatus 200 having to take any additional interfacing or protocol actions. The packets and dedupe processing may be transparent.

In some embodiments, logics 242, 244, and 246 may be added to apparatus 200 after apparatus 200 has already been operating for some period of time. Thus, apparatus 200 may already be interacting with a cloud-based computing environment using standard interfaces and protocols before apparatus 200 ever engages in collaborative de-duplication. Indeed, the need to de-duplicate data may not be known when apparatus 200 begins processing. Only after interacting with various services for a period of time, and then receiving bills for their cloud usage, may the user of apparatus 200 become interested in data de-duplication. Rather than add logics that require a proprietary interface, apparatus 200 can be updated with logics that will identify and employ standard interfaces and protocols already in use or supported by apparatus 200. Thus, apparatus 200 supports collaborative data de-duplication with transport layer transparency.

The hardware identification logic 242 is configured to identify networking hardware used by or supported by the apparatus 200 to interact with a cloud-based computing environment. In one embodiment, the hardware identification logic 242 is configured to identify the hardware as being capable of supporting traffic compliant with different protocols including, but not limited to, SOAP-compliant, and REST-compliant. Different networking hardware may have different constraints for messages or packets that are transmitted. Identifying the hardware may include, for example, examining other messages or packets being transmitted from the client apparatus 200, examining driver software installed on client apparatus 200, examining operating system information associated with client apparatus 200, examining user-defined data associated with apparatus 200, examining a user-configured file stored on apparatus 200, examining firmware in networking hardware associated with apparatus 200, and so on.

The protocol identification logic 244 is configured to identify a protocol used by or supported by the apparatus 200 to communicate messages for the cloud-based computing environment through the interface to the cloud-based computing environment. In one embodiment, the protocol identification logic 244 is configured to identify the protocol as being one or more of, SOAP-compliant, and REST-compliant. Different protocols may have different constraints for messages or packets that are transmitted using the protocol. Identifying the protocol may include, for example, examining other messages or packets being transmitted from the client apparatus 200 using the protocol, examining driver software installed on client apparatus 200, examining operating system information associated with client apparatus 200, examining user-defined data associated with apparatus 200, examining a user-configured file stored on apparatus 200, and so on. The protocol may define, for example, rules for communicating over a certain network, rules for communicating with a certain cloud, packet formats acceptable to the cloud, application programming interfaces (APIs) exposed by servers or services in the cloud, procedure call and response mechanisms employed by servers or services in the cloud, and so on.

The de-duplication preparation logic 246 is configured to prepare a message to be provided to the cloud-based computing environment through the networking hardware and according to the protocol. The message may include data to be de-duplicated, metadata concerning the data to be de-duplicated, or other entries. In one example, the de-duplication preparation logic 246 is configured to place the data to be de-duplicated in a first section of the message and to place the metadata concerning the data to be de-duplicated in a second section of the message. Data to be de-duplicated can include, for example, a sub-block of data, an identifier of a sub-block of data, a hash of a sub-block of data, a sample of a sub-block of data, and so on. The identifier, the hash, or the sample may be computed according to a certain "dialect" of de-duplication known to the client apparatus 200. The metadata concerning the data to be de-duplicated may include, for example, a boundary, a boundary character, a boundary algorithm identifier, a hash, a hash algorithm identifier, a sample, a sample algorithm identifier, and a dialect. How boundaries are thrown, how hashes are computed, how samples are taken, and so on, may also be computed according to a certain "dialect" of de-duplication known to the client apparatus 200. Thus, the metadata may include information that identifies the "dialect" of de-duplication being performed by the apparatus 200.

Since the hardware identification logic 242 and the protocol identification logic 244 may identify the networking hardware and protocol as being, for example, SOAP-compliant or REST-compliant, in one embodiment the de-duplication preparation logic 246 may be configured to prepare the message to be SOAP-compliant or REST-compliant. One characteristic of some SOAP-compliant messages or packets is that messages can carry both data and metadata. The metadata may provide information about how to identify, process, or otherwise handle the data. Therefore, in one embodiment, the de-duplication preparation logic 246 is configured to place the metadata in one or more XML attributes associated with the message.

Figure 3:
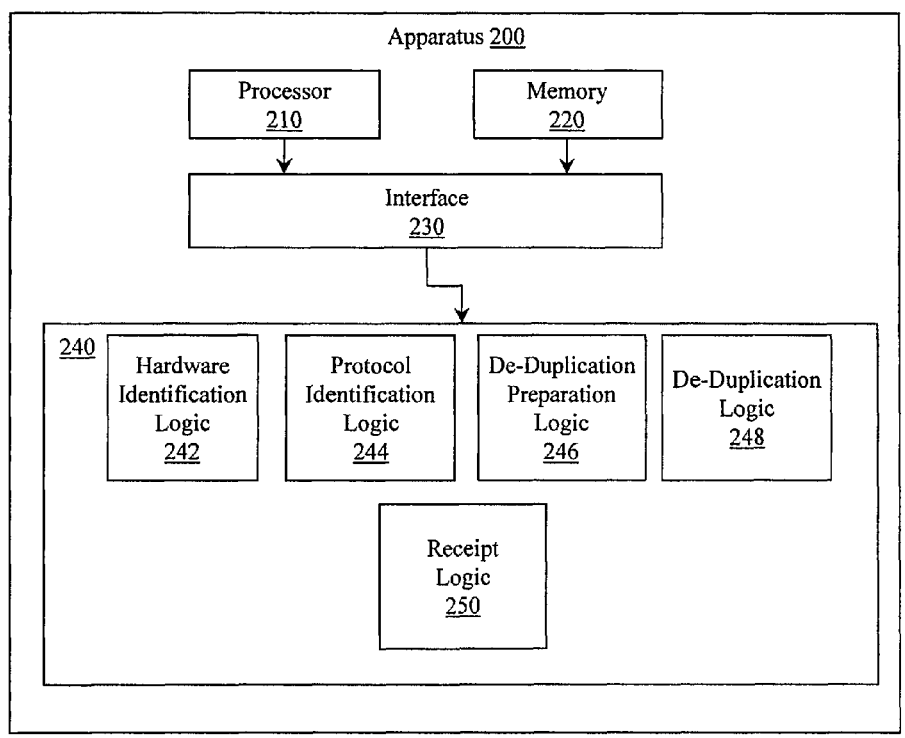
FIG. 3 illustrates an apparatus that supports cloud-based de-duplication with transport layer transparency.

FIG. 3 illustrates another embodiment of apparatus 200. This embodiment includes additional logics when compared to the embodiment in FIG. 2. The additional logics include a de-duplication logic 248 and a receipt logic 250. The de-duplication logic 248 may be configured to sub-divide a block of data into one or more sub-blocks of data according to a chunking protocol. The de-duplication logic 248 may also be configured to compute de-duplication tokens associated with the one or more sub-blocks of data according to a tokenization protocol. Since this embodiment of apparatus 200 may be performing some de-duplication processing (e.g., chunking, hashing), the metadata concerning the data to be de-duplicated may also include an identifier of the chunking protocol and an identifier of the tokenization protocol.

The receipt logic 250 may be configured to receive a message from the cloud-based computing environment through the networking hardware according to the protocol. The receipt logic 250 may also be configured to identify the message as a de-duplication message. Identifying a received message as a de-duplication message may include, for example, examining a message header, examining message contents, examining metadata included in the message, and so on. The hardware and protocol identified by apparatus 200 provide context for examining a received message and for determining whether that received message is a de-duplication message. The dialect being used by apparatus 200 may also provide context for parsing, interpreting, or otherwise processing the received message.

Example systems and methods may perform dedupe processing in different ways for data that is stored in different ways (e.g., archived, stored near-line, stored on-line). Archiving typically focuses on preserving documents or data in a form that has some sort of certifiable integrity. Archives are generally immune to unauthorized access and tampering, and can be the subject of record management operations (e.g., automatic deletion after a certain period, auditor-initiated retrieval). Archives are generally conceived to be an operational system for processing documents and/or data that are no longer in active use. Near-lining concerns holding data that is used less frequently than the most current data but that is used frequently enough that archiving may store the data too deeply. Near-line data is contrasted to online data, which will be the most currently used data. Near-line storage represents a compromise between online storage and offline storage (e.g., archive).

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations include physical manipulations of physical quantities. Usually, though not necessarily, the physical quantities take the form of electrical or magnetic signals capable of being stored, transferred, combined, compared, and otherwise manipulated in a logic. The physical manipulations transform electronic components and/or data representing physical entities from one state to another.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

Figure 4:
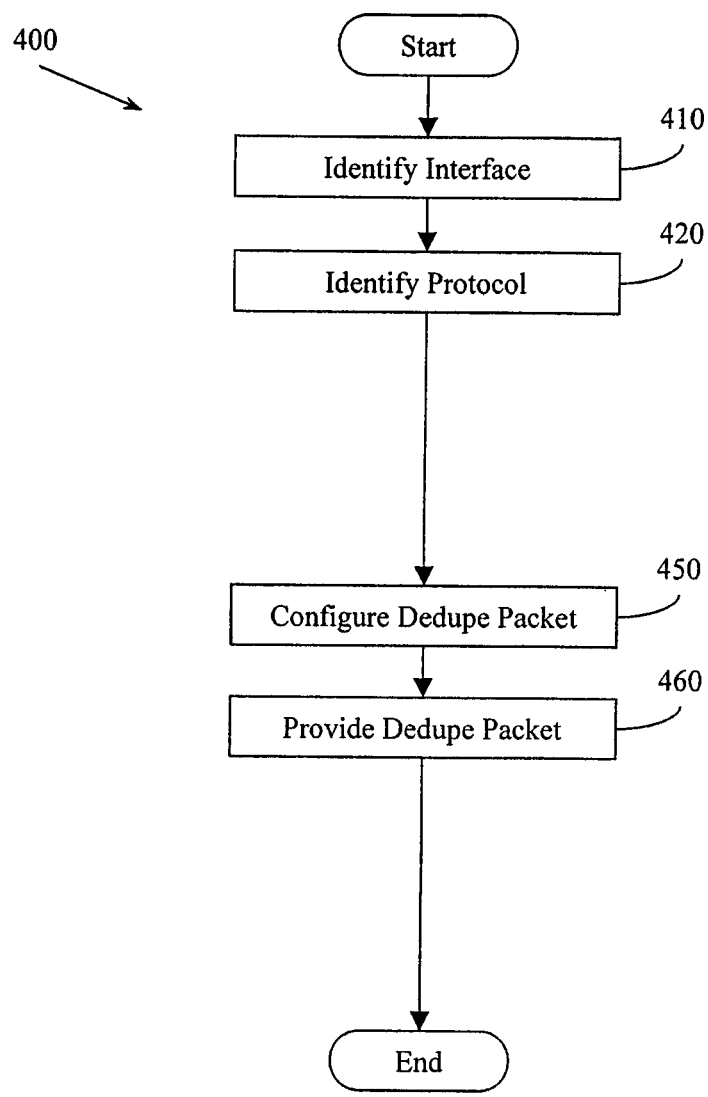
FIG. 4 illustrates a method that supports cloud-based de-duplication with transport layer transparency.

FIG. 4 illustrates a method 400 that supports cloud-based de-duplication with transport layer transparency. An apparatus that is already interacting with a cloud-based computing environment may perform method 400 without raising exceptions in either the interfaces or protocols being used by the apparatus to interact with the cloud-based computing environment. Thus, packets prepared using method 400 may pass through the interfaces and protocols without the apparatus having to take any additional or proprietary interfacing or protocol actions.

Method 400 includes, at 410, controlling a client apparatus to identify an interface used by the client apparatus to interact with a server in a cloud-based computing environment. The interface may be defined, for example, by a combination of networking hardware, timing, and formatting used for interfacing with the cloud-based computing environment.

Method 400 also includes, at 420, controlling the client apparatus to identify a protocol used to communicate through the interface. The protocol may be defined, for example, by a combination of packet formatting, end-to-end communication rules, procedure call and response rules, application defined data, and so on. One skilled in the art will appreciate that in some examples, an interface and a protocol may be entwined and overlap. One skilled in the art will also appreciate that in other examples, an interface and a protocol may be distinct items. For example, an interface may be defined completely by networking hardware while a protocol may be defined completely by logical rules and packet formats.

In one example, the interface and protocol may be SOAP compliant while in another example the interface and protocol may be REST compliant. While SOAP and REST are described, one skilled in the art will appreciate that a client may interact with a cloud-based computing environment using other interfaces and protocols. Identifying the interface(s) and protocol(s) being used to communicate with a cloud-based computing environment may include, for example, examining operating system information, examining file system information, examining driver information, monitoring packets transmitted and/or received by an apparatus, and so on. In one example, a user may configure an apparatus with information that explicitly identifies the interfaces and protocols to be used for interacting with a cloud-based computing environment.

Method 400 also includes, at 450, controlling the client apparatus to configure a de-duplication packet that conforms to the protocol and to the interface. The de-duplication packet may be, for example, a de-duplication negotiated transfer packet. A de-duplication negotiated transfer packet may include information through which a client apparatus and a server apparatus can come to an agreement about a collaborative de-duplication approach.

In one embodiment, configuring the de-duplication packet comprises placing de-duplication data in a first portion of the packet and placing de-duplication metadata in a second portion of the packet. The de-duplication data may be, for example, data to be de-duplicated, an identifier of data to be de-duplicated, a hash of data to be de-duplicated, and a sample of data to be de-duplicated. In one example, the second portion may be an extensible markup language (XML) attribute(s).

The de-duplication metadata may identify the de-duplication packet as a de-duplication packet. In one embodiment, the de-duplication metadata may identify items including, but not limited to, what de-duplicating the client is performing, and what de-duplicating the client wants to perform. In different embodiments, the de-duplication metadata may identify items including, but not limited to, a de-duplication boundary, a boundary algorithm, a hash, a hash algorithm, an identifier, an identifier algorithm, a sample, a sample algorithm, and a de-duplication dialect. The boundary may have been placed to partition a block of data into one or more sub-blocks of data. The hash may have been computed for the sub-block of data. The identifier may be some value computed from the sub-block or some other item used to uniquely identify a sub-block of data. The sample may be a subset of the sub-block of data. One skilled in the art of data de-duplication will appreciate that different de-duplication approaches and dialects may use different boundary positioning techniques, different hashing techniques, different identifier techniques, different sampling techniques, and so on.

Method 400 also includes, at 460, controlling the client apparatus to provide the de-duplication packet to the cloud-based computing environment in a transport transparent manner through the interface according to the protocol. Since the method 400 includes identifying an interface and a protocol already known by or even in use by the apparatus, and since the method also includes producing a packet that conforms to the interface and protocol, the packet should simply pass from the apparatus to the cloud transparently, the same as other packets being sent.

Figure 5:
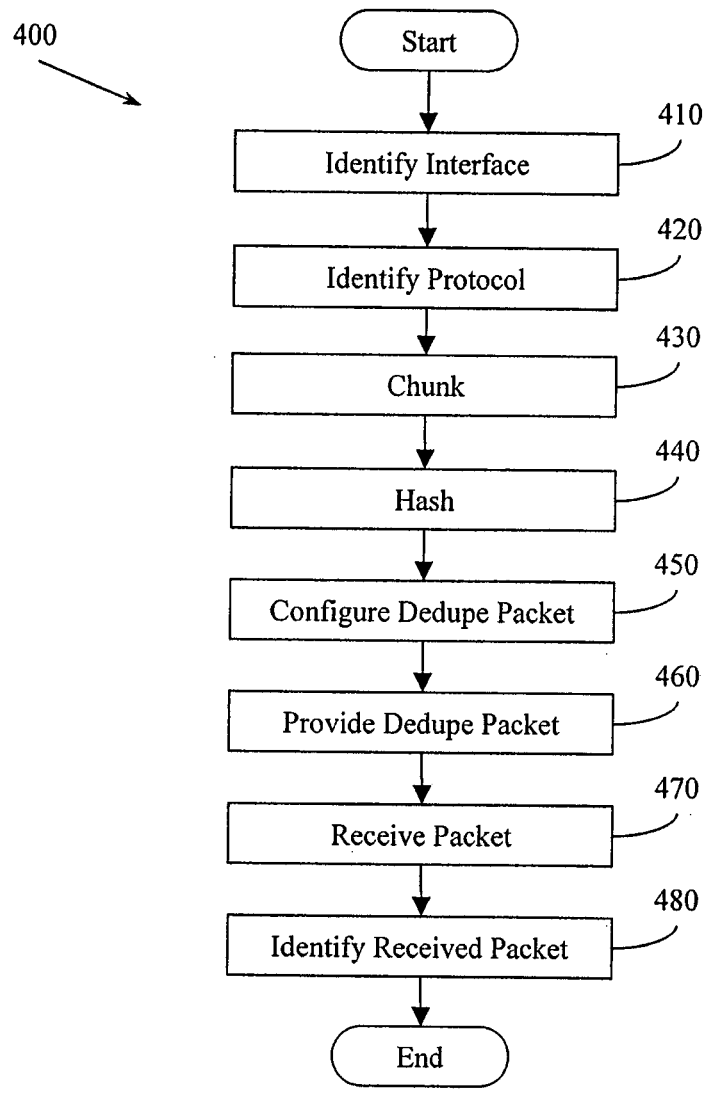
FIG. 5 illustrates a method that supports cloud-based de-duplication with transport layer transparency.

FIG. 5 illustrates another embodiment of method 400 (FIG. 4). This embodiment includes additional actions at 430, 440, 470, and 480. This embodiment includes, at 430, controlling the client apparatus to sub-divide a block of data on the client apparatus into one or more sub-blocks of data according to a de-duplication sub-dividing protocol. Since the client apparatus is performing the de-duplication chunking function, the de-duplication metadata may include a de-duplication sub-dividing protocol identifier.

This embodiment also includes, at 440, controlling the client apparatus to hash a sub-block of data according to a de-duplication hashing protocol. Since the client apparatus is performing the de-duplication hashing function, the de-duplication metadata may include a de-duplication hashing protocol identifier.

This embodiment also includes, at 470, controlling the client apparatus to receive a packet from the cloud-based computing environment through the interface according to the protocol. Having received the packet at 470, this embodiment then proceeds, at 480, to determine whether the received packet is a de-duplication packet. Determining whether the received packet is a de-duplication packet can include, for example, examining packet contents, examining packet header contents, examining packet metadata, and so on. Method 400 will have some context for making parsing attempts on the received packet. The context will be provided by knowing the interface identified at 410 and knowing the protocol identified at 420.

The method can also include controlling the client apparatus to selectively transmit an additional related message as a function of metadata included in the received packet. The additional related message may include data to be de-duplicated.

In one example, a method may be implemented as computer executable instructions. Thus, in one example, a non-transitory computer readable medium may store computer executable instructions that if executed by a computer (e.g., de-duplication client) cause the computer to perform methods described herein.

The following includes definitions of selected terms employed herein. The definitions include various examples and/or forms of components that fall within the scope of a term and that may be used for implementation. The examples are not intended to be limiting.

References to "one embodiment", "an embodiment", "one example", "an example", and other similar terms indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" or "in one example" does not necessarily refer to the same embodiment or example.

"Computer readable medium", as used herein, refers to a medium that stores signals, instructions and/or data. A computer readable medium may take forms, including, but not limited to, non-volatile media, and volatile media. Non-volatile media may include, for example, optical disks, and magnetic disks. Volatile media may include, for example, semiconductor memories, and dynamic memory. Common forms of a computer readable medium may include, but are not limited to, a floppy disk, a flexible disk, a hard disk, a magnetic tape, other magnetic medium, an ASIC, a CD (compact disk), other optical medium, a RAM (random access memory), a ROM (read only memory), a memory chip or card, a memory stick, and other media from which a computer, a processor, or other electronic device can read.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, ABC, AAA, AAB, AABB, AABBC, AABBCC, and so on (e.g., the data store may store only A, only B, only C, A&B, A&C, B&C, A&B&C, A&A&A, A&A&B, A&A&B&B, A&A&B&B&C, A&A&B&B&C&C, and so on). It is not intended to require one of A, one of B, and one of C. When the applicants intend to indicate "at least one of A, at least one of B, and at least one of C", then the phrasing "at least one of A, at least one of B, and at least one of C" will be employed.

While example apparatus, methods, and articles of manufacture have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

All elements, parts and steps described herein are preferably included. It is to be understood that any of these elements, parts and steps may be replaced by other elements, parts and steps or deleted altogether as will be obvious to those skilled in the art.

Broadly, this writing discloses example apparatus, methods, and computers supporting cloud-based de-duplication with transport layer transparency. One example apparatus includes a processor, a memory, and an interface to connect the processor, memory, and a set of logics. The set of logics includes a hardware identification logic for identifying networking hardware used by or available to the apparatus to interact with a cloud-based computing environment and a protocol identification logic for identifying a protocol used by or available to the apparatus to communicate messages for the cloud-based computing environment through the networking hardware. The set of logics also includes a de-duplication preparation logic for preparing a message to carry data to be de-duplicated and metadata concerning the data to be de-duplicated. The message is to be provided to the cloud-based computing environment through the networking hardware according to the protocol.

Concepts

This writing has disclosed at least the following concepts.

Concept 1. An apparatus, comprising:
  a processor;
  a memory; and
  an interface to connect the processor, the memory, and a set of logics, the set of logics comprising:
  a hardware identification logic configured to identify networking hardware supported by the apparatus to interact with a cloud-based computing environment through a computer network;
  a protocol identification logic configured to identify a protocol supported by the apparatus to communicate messages for the cloud-based computing environment through the networking hardware, the protocol comprising one or more of, a set of rules for communicating over the computer network, a set of procedure calls available for communicating over the computer network, and a set of application programming interfaces available for communicating over the computer network; and
  a de-duplication preparation logic configured to prepare a collaborative data de-duplication message to carry one or more of, data to be de-duplicated, and metadata concerning the data to be de-duplicated, where the collaborative data de-duplication message is to be provided to the cloud-based computing environment through the networking hardware according to the protocol.

Concept 2. The apparatus of Concept 1, where the de-duplication preparation logic is configured to place the data to be de-duplicated in a first logical section of the message and to place the metadata concerning the data to be de-duplicated in a second logical section of the message,
  where the data to be de-duplicated comprises one or more of, a sub-block of data, an identifier of a sub-block of data, a hash of a sub-block of data, and a sample of a sub-block of data, and
  where the metadata concerning the data to be de-duplicated comprises one or more of, a boundary, a boundary character, a boundary algorithm identifier, a hash, a hash algorithm identifier, a sample, a sample algorithm identifier, and a dialect.

Concept 3. The apparatus of Concept 1,
  where the protocol identification logic is configured to identify the protocol as being one or more of, simple object access protocol (SOAP) compliant, representational state transfer (REST) compliant, hypertext transfer protocol (HTTP) compliant, and extensible markup language (XML)-compliant;
  where the de-duplication preparation logic is configured to prepare the message to be one or more of, SOAP-compliant, REST-compliant, HTTP-compliant, and XML-compliant, and
  where the de-duplication preparation logic is configured to place the metadata in one or more XML attributes associated with the message.

Concept 4. The apparatus of Concept 1, the set of logics comprising:
  a de-duplication logic configured to sub-divide a block of data into one or more sub-blocks of data according to a chunking protocol and to compute de-duplication tokens associated with the one or more sub-blocks of data according to a tokenization protocol, and where the metadata concerning the data to be de-duplicated comprises one or more of, an identifier of the chunking protocol, and an identifier of the tokenization protocol.

Concept 5. The apparatus of Concept 1, the set of logics comprising:
  a receipt logic configured to receive a message from the cloud-based computing environment through the networking hardware according to the protocol, and to identify the message as a de-duplication message.

Concept 6. A method for controlling a client apparatus, comprising:
  controlling the client apparatus to identify an interface supported by the client apparatus to interact with a cloud-based computing environment;
  controlling the client apparatus to identify a protocol supported by the client apparatus to communicate through the interface;
  controlling the client apparatus to configure a de-duplication packet that conforms to the protocol and to the interface; and
  controlling the client apparatus to provide the de-duplication packet to the cloud-based computing environment in a transport transparent manner through the interface according to the protocol.

Concept 7. The method of Concept 6, where configuring the de-duplication packet comprises selectively placing de-duplication data in a first logical portion of the packet and selectively placing de-duplication metadata in a second, different logical portion of the packet, where the first portion and the second portion are defined by the protocol.

Concept 8. The method of Concept 6, where the de-duplication data comprises one or more of, data to be de-duplicated, an identifier of data to be de-duplicated, a hash of data to be de-duplicated, and a sample of data to be de-duplicated.

Concept 9. The method of Concept 7, where the de-duplication metadata identifies the de-duplication packet as a de-duplication packet.

Concept 10. The method of Concept 7, where the de-duplication metadata identifies one or more of, what portion of collaborative de-duplicating the client is performing, and what portion of collaborative de-duplicating the client wants to perform.

Concept 11. The method of Concept 7, where the de-duplication metadata identifies one or more of, a boundary, a boundary algorithm, a hash, a hash algorithm, an identifier, an identifier algorithm, a sample, a sample algorithm, and a de-duplication dialect.

Concept 12. The method of Concept 7, where the second portion comprises one or more extensible markup language (XML) attributes.

Concept 13. The method of Concept 6, where the interface and protocol are one or more of, simple object access protocol (SOAP) compliant, and representational state transfer (REST) compliant.

Concept 14. The method of Concept 6, where the interface and protocol are one or more of, HTTP compliant, and XML compliant.

Concept 15. The method of Concept 6, the method being transparent to a transport layer associated with one or more of, the interface, and the protocol.

Concept 16. The method of Concept 15, where being transparent to a transport layer comprises having the packet pass through the interface according to the protocol without generating an interface exception and without generating a protocol exception.

Concept 17. The method of Concept 7, comprising:
controlling the client apparatus to sub-divide a block of data on the client apparatus into one or more sub-blocks of data according to a de-duplication sub-dividing protocol, and where the de-duplication metadata comprises a de-duplication sub-dividing protocol identifier.

Concept 18. The method of Concept 17, comprising:
controlling the client apparatus to hash a sub-block of data according to a de-duplication hashing protocol, and where the de-duplication metadata comprises a de-duplication hashing protocol identifier.

Concept 19. The method of Concept 6, comprising:
controlling the client apparatus to identify a received packet as a de-duplication packet, the received packet being received from the cloud-based computing environment through the interface according to the protocol.

Concept 20. The method of Concept 19, comprising controlling the client apparatus to selectively transmit an additional related message as a function of metadata included in the received packet.

Concept 21. The method of Concept 20, where the additional related message includes data to be de-duplicated.

Concept 22. A non-transitory computer-readable medium storing computer-executable instructions that when executed by a client apparatus participating in cloud-based computing control the client apparatus to perform a method, the method comprising:

controlling the client apparatus to identify an interface used by the client apparatus to interact with a server in the cloud-based computing environment; and controlling the client apparatus to configure a transport layer transparent de-duplication packet to be used in cloud-based collaborative data de-duplication to conform to the interface.

The invention claimed is:

1. An apparatus, comprising:
a processor;
a memory; and
an interface to connect the processor, the memory, and a set of logics, the set of logics comprising:
a hardware identification logic configured to identify networking hardware supported by the apparatus to interact with a cloud-based computing environment through a computer network;
a protocol identification logic configured to identify a protocol supported by the apparatus to communicate messages for the cloud-based computing environment through the networking hardware, the protocol comprising one or more of, a set of rules for communicating over the computer network, a set of procedure calls available for communicating over the computer network, and a set of application programming interfaces available for communicating over the computer network; and
a de-duplication preparation logic configured to prepare a collaborative data de-duplication message to carry one or more of, data to be de-duplicated, and metadata concerning the data to be de-duplicated, where the collaborative data de-duplication message is to be provided to the cloud-based computing environment through the networking hardware according to the protocol,
where the de-duplication preparation logic is configured to place the data to be de-duplicated in a first logical section of the message and to place the metadata concerning the data to be de-duplicated in a second logical section of the message,
where the data to be de-duplicated comprises one or more of, a sub-block of data, an identifier of a sub-block of data, a hash of a sub-block of data, and a sample of a sub-block of data, and
where the metadata concerning the data to be de-duplicated comprises one or more of, a boundary, a boundary character, a boundary algorithm identifier, a hash, a hash algorithm identifier, a sample, a sample algorithm identifier, and a dialect.

2. The apparatus of claim 1,
where the protocol identification logic is configured to identify the protocol as being one or more of, simple object access protocol (SOAP) compliant, representational state transfer (REST) compliant, hypertext transfer protocol (HTTP) compliant, and extensible markup language (XML)-compliant;
where the de-duplication preparation logic is configured to prepare the message to be one or more of, SOAP-compliant, REST-compliant, HTTP-compliant, and XML-compliant, and
where the de-duplication preparation logic is configured to place the metadata in one or more XML attributes associated with the message.

3. The apparatus of claim 1, the set of logics comprising:
a de-duplication logic configured to sub-divide a block of data into one or more subblocks of data according to a chunking protocol and to compute de-duplication tokens associated with the one or more sub-blocks of data according to a tokenization protocol, and where the metadata concerning the data to be de-duplicated comprises one or more of, an identifier of the chunking protocol, and an identifier of the tokenization protocol.

4. The apparatus of claim 1, the set of logics comprising:
a receipt logic configured to receive a message from the cloud-based computing environment through the networking hardware according to the protocol, and to identify the message as a de-duplication message.

5. A method for controlling a client apparatus, comprising:
controlling the client apparatus to identify an interface supported by the client apparatus to interact with a cloud-based computing environment;
controlling the client apparatus to identify a protocol supported by the client apparatus to communicate through the interface;
controlling the client apparatus to configure a de-duplication packet that conforms to the protocol and to the interface; and
controlling the client apparatus to provide the de-duplication packet to the cloud-based computing environment in a transport transparent manner through the interface according to the protocol,
where configuring the de-duplication packet includes placing data to be de-duplicated in a first logical section of the packet and placing metadata concerning the data to be de-duplicated in a second logical section of the packet,
where the data to be de-duplicated comprises one or more of, a sub-block of data, an identifier of a sub-block of data, a hash of a sub-block of data, and a sample of a sub-block of data, and
where the metadata concerning the data to be de-duplicated comprises one or more of, a boundary, a boundary character, a boundary algorithm identifier, a hash, a hash algorithm identifier, a sample, a sample algorithm identifier, and a dialect.

6. The method of claim 5, where the de-duplication data comprises one or more of, data to be de-duplicated, an identifier of data to be de-duplicated, a hash of data to be de-duplicated, and a sample of data to be de-duplicated.

7. The method of claim 5, where the de-duplication metadata identifies the de-duplication packet as a de-duplication packet.

8. The method of claim 5, where the de-duplication metadata identifies one or more of, what portion of collaborative de-duplicating the client is performing, and what portion of collaborative de-duplicating the client wants to perform.

9. The method of claim 5, where the de-duplication metadata identifies one or more of, a boundary, a boundary algorithm, a hash, a hash algorithm, an identifier, an identifier algorithm, a sample, a sample algorithm, and a de-duplication dialect.

10. The method of claim 5, where the second portion comprises one or more extensible mark up language (XML) attributes.

11. The method of claim 5, where the interface and protocol are representational state transfer (REST) compliant.

12. The method of claim 5, where the interface and protocol are one or more of, HTTP compliant, and XML compliant.

13. The method of claim 5, the method being transparent to a transport layer associated with one or more of, the interface, and the protocol.

14. The method of claim 13, where being transparent to a transport layer comprises having the packet pass through the interface according to the protocol without generating an interface exception and without generating a protocol exception.

15. The method of claim 5, comprising:
controlling the client apparatus to sub-divide a block of data on the client apparatus into one or more sub-blocks of data according to a de-duplication sub-dividing protocol, and where the de-duplication metadata comprises a de-duplication sub-dividing protocol identifier.

16. The method of claim 15, comprising:
controlling the client apparatus to hash a sub-block of data according to a de-duplication hashing protocol, and where the de-duplication metadata comprises a de-duplication hashing protocol identifier.

17. The method of claim 5, comprising:
controlling the client apparatus to identify a received packet as a de-duplication packet, the received packet being received from the cloud-based computing environment through the interface according to the protocol.

18. The method of claim 17, comprising controlling the client apparatus to selectively transmit an additional related message as a function of metadata included in the received packet.

19. The method of claim 18, where the additional related message includes data to be de-duplicated.

20. A method, comprising:
controlling a client apparatus to identify an interface used by the client apparatus to interact with a server in a cloud-based computing environment; and
controlling the client apparatus to configure a transport layer transparent de-duplication packet to be used in cloud-based collaborative data de-duplication to conform to the interface,
where configuring the transport layer transparent de-duplication packet includes placing data to be de-duplicated in a first logical section of the packet and placing metadata concerning the data to be de-duplicated in a second logical section of the packet,
where the data to be de-duplicated comprises one or more of, a sub-block of data, an identifier of a sub-block of data, a hash of a sub-block of data, and a sample of a sub-block of data, and
where the metadata concerning the data to be de-duplicated comprises one or more of, a boundary, a boundary character, a boundary algorithm identifier, a hash, a hash algorithm identifier, a sample, a sample algorithm identifier, and a dialect.

* * * * *

UNITED STATES PATENT AND TRADEMARK OFFICE
CERTIFICATE OF CORRECTION

| | | |
|---|---|---|
| PATENT NO. | : 8,886,716 B2 | Page 1 of 1 |
| APPLICATION NO. | : 13/351183 | |
| DATED | : November 11, 2014 | |
| INVENTOR(S) | : Tofano | |

It is certified that error appears in the above-identified patent and that said Letters Patent is hereby corrected as shown below:

In the Specification

In Column 5, line 59, delete "being already being" and insert --already being--.

Signed and Sealed this
Seventeenth Day of March, 2015

Michelle K. Lee
*Director of the United States Patent and Trademark Office*